Sept. 22, 1942.  J. W. WILLS  2,296,411
FLUID PRESSURE INDICATOR
Filed March 15, 1941
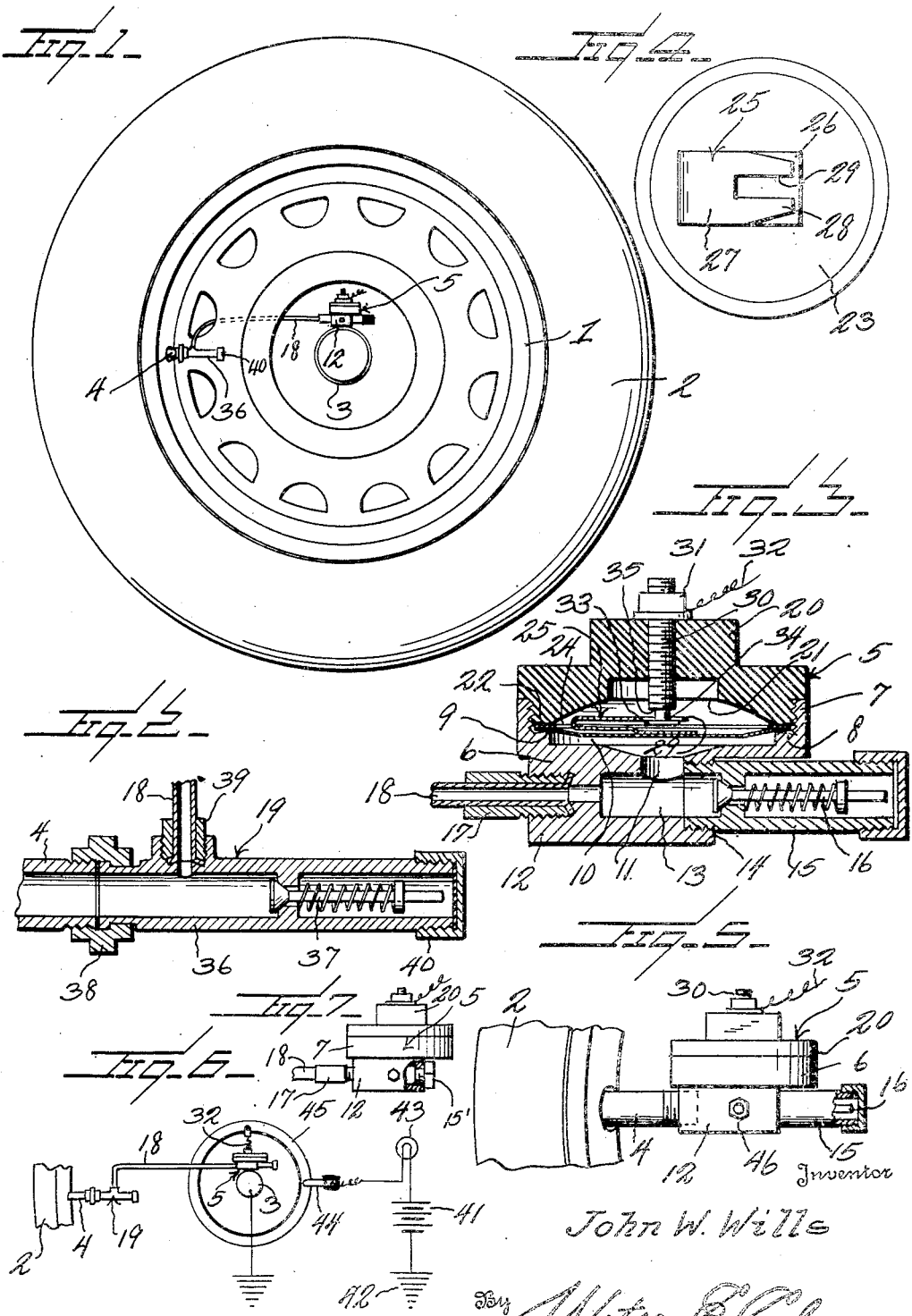
Inventor
John W. Wills
By Watson E. Coleman
Attorney Patented Sept. 22, 1942

2,296,411

UNITED STATES PATENT OFFICE 2,296,411

FLUID PRESSURE INDICATOR

John W. Wills, Richmond, Va.

Application March 15, 1941, Serial No. 383,645

2 Claims. (Cl. 200—58)

This invention relates generally to the class of signaling and pertains particularly to an improved pressure actuated indicator for use in connection with receptacles containing a fluid under pressure to indicate when such pressure is different from that desired, the invention being primarily designed for use with an automobile or other type of pneumatic tire for indicating when the pressure therein is different from that required for proper or safe operation of the same.

In the operation of motor vehicles or other vehicles employing supporting wheels equipped with pneumatic tires, it is very essential that such tires be kept inflated to the proper pressure in order that the maximum usage may be obtained of the tire and particularly to guard against rupture of the tire casing. It is, of course, well understood by motorists that the tires of their cars must be kept at the proper pressure, otherwise if the pressure is too low, the casing will be constantly flexed during the running of the car, which will not only result in the quick breaking down of the fabric but will result in the development of heat, which causes the pressure to be built up in the casing sometimes to a dangerous degree. A signaling device which will give warning when the tire is under-inflated or over-inflated is, therefore, of considerable value as it insures an extension of the life of the tire. In commercial vehicles, particularly large trucks where dual wheels are employed, great losses are sustained by the owners of such vehicles as a result of drivers allowing the tires to go under-inflated and particularly with regard to the tires of the dual wheels where the operator may become careless about keeping the two adjacent tires of a dual wheel at the proper pressure. If the tires of such wheels are not maintained at the proper pressure, one tire may become deflated by result of puncture or from a blowout, and if the other tire is not up to standard pressure when it is called upon to sustain the load previously shared by the other tire, it fails to do so, with the result that two tires are destroyed in place of one.

The present invention has for its primary object to provide a novel signaling circuit controlling device for use in connection with motor vehicle tires and also in connection with the inflated tires of airplanes or other airships, which is designed in a novel manner to not only indicate a condition of under-inflation but also to indicate a condition of over-inflation of the tire with which it is associated, so that the device operates as a two-way safety means for energizing a signaling circuit when the tire pressure changes from normal.

Another object of the invention is to provide a device of the above described character which not only functions to signal a condition of over-inflation as well as under-inflation, but which is of such design or construction that it may be made in a very small unit which can be either mounted directly upon the tire valve or mounted within the hub chamber of the wheel beneath the usual hub cap where it is to be used upon a pleasure vehicle so that its weight will not cause an unbalancing of the wheel.

The invention will be best understood from a consideration of the following detailed description taken in connection with the accompanying drawing, it being understood, however, that the invention is not to be considered as limited by the specific illustration or description but that such illustration and description constitutes a preferred embodiment of the invention.

In the drawing:

Fig. 1 is a view in elevation of a pneumatic tired wheel showing the device embodying the present invention applied thereto, the hub cap of the wheel being removed to show the mounting of the device upon the hub.

Fig. 2 is a longitudinal sectional view of the auxiliary valve which is applied to the regular tire valve and which is illustrated in Fig. 1.

Fig. 3 is a vertical sectional view through the pressure responsive circuit controlling unit of the invention.

Fig. 4 is a view in top plan of the metallic diaphragm forming a part of the unit of Fig. 3.

Fig. 5 is a view illustrating the mounting of the pressure responsive unit directly upon a valve stem.

Fig. 6 is a diagrammatic view illustrating a circuit layout in which the pressure responsive unit is connected.

Fig. 7 is a detail view partly in elevation and partly in section showing a desired arrangement of the pressure responsive unit for mounting upon the hub or at the center of a pneumatic wheel.

In the application of the present invention, the pressure responsive circuit controlling unit may be disposed in either of two locations dependent upon whether it is to be applied to a wheel of a pleasure car which should not have its balance disturbed or whether it is to be applied to the wheel of a truck where an unbalancing of the wheel is not of great importance. Fig. 1 illustrates a manner of applying the device to the wheel of a pleasure vehicle. As previously stated, it is important that the wheels of pleasure vehicles, particularly the front wheels, be kept balanced in order to avoid shimmying or other undesirable movement of the wheel when rotating at high speed, and while the pressure responsive device of the present invention may be made very small and relatively light as previously stated, nevertheless, its application directly to the valve stem of the front wheel of a pleasure vehicle, even though the device may have a weight of only one or two ounces, would be sufficient to unbalance the wheel and cause the same to shimmy or exhibit some other undesirable action.

In Fig. 1, the device is shown mounted near the center of the wheel. In this figure, the wheel rim is indicated generally by the numeral 1, while the tire is indicated at 2. The hub cap of the wheel has been removed, thus showing the hub 3 in end elevation.

The numeral 4 designates the valve stem which forms a part of the inner tube of the tire.

A signaling circuit controlling, pressure responsive unit of the present invention, is indicated generally in Fig. 1, by the numeral 5, where it is shown mounted within the hub chamber of the wheel, preferably upon the hub 3. In placing the unit 5 in this situation, it is gotten as close to the center of the wheel as possible and, therefore, will have little or no effect upon the balance of the wheel.

The unit 5 is illustrated in detail in Fig. 3, where it is seen that it comprises a metallic body 6, preferably of circular form, one side of which is open and defined by a circular wall 7 around the inner face of which is formed a shoulder 8 having a sharp inner edge 9. Below the plane of the edge 9 of the shoulder, the body is cut out to form a chamber 10 through the bottom of which is an air opening 11.

Formed integrally with the body 6 upon the side opposite from the open side thereof is a boss 12 through which is formed the passage 13. The major portion of this passage is of relatively large diameter as shown in Fig. 3, and has the opening 11 in communication therewith and one end of the passage is screw threaded as indicated at 14, to receive the threaded end of the housing 15 for a valve inside unit 16. The opposite end of the passage 13 is also screw threaded to receive a coupling 17 such as is shown in Fig. 1, or to receive the threaded end of the tire valve stem 4 depending on whether the unit 5 is mounted in the hub chamber of the wheel, as shown in Fig. 1, or whether it is to be mounted directly upon the valve stem.

When the unit is mounted within the hub chamber of the wheel, the coupling 17 secures in the end of the passage 13, a small bore metallic tube 18 which extends radially to the valve stem for the connection therewith through medium of the auxiliary valve stem which is shown in Fig. 2 and indicated generally by the numeral 19. The detailed description of the construction of this auxiliary stem will be hereinafter given.

Threadably secured in the open side of the body 6 is an insulation body cap or top 20, the inner face of which is chambered as indicated at 21 for disposition in opposed relation with the chamber 10, the periphery of the chamber 21 being defined by a shoulder 22 which opposes the shoulder 8 and the inner edge thereof.

Resting upon the edge 9 of the shoulder 8 is a metallic wafer or diaphragm 23 and between this diaphragm and the shoulder 22 of the insulation body is a suitable gasket 24 to establish an air-tight connection between the diaphragm and the shoulder 22.

The diaphragm 23 is formed from thin case hardened sheet steel and it is normally flexed downwardly into the chamber 10. The diaphragm, as previously stated, rests adjacent its periphery upon the sharpened edge 9 of the shoulder 8 and thus when pressure is applied to the under side of the diaphragm, the peripheral portion has a certain amount of rocking motion upon this shoulder edge which permits it to flex upwardly.

In order that the proper flexing action of the diaphragm may be obtained, it is necessary after the diaphragm has been shaped and given the desired degree of flexibility, that the skin surface be broken by drawing a file across the convex side, or in some other suitable manner. If such skin surface is not broken in this manner, the proper flexing of the wafer will not take place when air pressure is applied to the convex under surface when the wafer is secured between the chambers in the unit 5.

To the upper side of the wafer 23 or diaphragm there is secured a claw 25 which is in the form of a substantially U-shaped body of metal having one side 26 secured to the face of the wafer while the overlying other side 27 is provided with the furcations 28 which are in spaced parallel relation to form the slot 29 therebetween. The furcations or prongs of this claw are arranged at appoximately the center of the wafer so that the slot 29 is alined with a post 30 which extends axially through the insulation body 20 to the outer side thereof where it carries a terminal nut 31 by which an electric current conductor 32 is secured thereto. The inner end of the post 30 has a head 33 which is connected by a neck 34 to the post and the inner end of the post forms a contact shoulder 35 around the neck 34.

The neck portion 34 of the terminal post engages in the slot 29 of the claw and the movement of the diaphragm or wafer 23 is limited by the head 33 and shoulder 35 through the medium of the claw prongs or furcations 28 which are disposed on either side of the neck but are free from contact therewith.

In Fig. 3 the wafer or diaphragm is shown relaxed or in down position where the claw is in electrical contact with the head 33 of the terminal post. When the unit is in use and the tire associated therewith has the proper air pressure in it, the diaphragm will be forced upwardly until the claw is spaced between the head 33 and the shoulder 35 where it will be out of electrical connection with the terminal post.

The auxiliary valve stem 19 comprises a tubular body 36 in one end of which a valve inside unit 37 is mounted while the opposite end is provided with a coupling 38 to facilitate its attachment to the end of the valve stem 4. Intermediate the coupling 38 and the valve inside unit 37 is a coupling 39 by which the other end of the tube 18 is connected with the auxiliary valve stem so as to be in communication with the air in the tire. The valve inside units 16 and 37 are not specifically described as these in themselves form no part of the present invention and may constitute standard inside units such as are commonly employed in tire valve stems.

With the arrangement shown in Fig. 1, it will be readily apparent that when air is to be introduced into the tire through the stem 4, this is accomplished by applying the air hose to the outer end of the auxiliary stem 19 after removing the cover cap 40 and as the air pressure in the tube rises, the air will be transmitted through the pipe 18 to the chamber 10 beneath the diaphragm 23. The unit 5 is connected in a suitable signaling circuit such, for example, as is illustrated in Fig. 6. In this circuit there is provided a source of electrical potential 41, one side of which is grounded to the vehicle frame in the usual manner, as indicated at 42, while the opposite side is connected through an indicator 43 with a wiper contact 44. Such a contact may be mounted upon a stationary part of the wheel such as the brake band supporting plate surrounding the wheel axle. Encircling the wheel axle and supported on the wheel to turn therewith is a current pick-up ring 45 with which is connected the current conductor 32, which is coupled as previously stated, with the terminal post 30. The metallic body 6 is grounded to the wheel hub on which it is mounted or to a suitable adjacent portion of the wheel and this, of course, forms the means for completing the circuit with the battery 41. Thus it will be seen that when the tire is deflated, the claw 25 will be in electrical contact with the head 33 of the terminal post 30, and thus an electric circuit will be completed through the signaling element 43 to energize the same. When the inflation of the tire reaches the proper poundage, the claw will be shifted due to the flexing of the wafer 23 as a result of the pressure of the air in the chamber 10, away from the terminal post head, thus opening the circuit and de-energizing the signal. It will be readily apparent that if the tire is overinflated, the diaphragm will be forced to such an extent toward the post 30 as to bring the claw 25 into contact with the shoulder 35, thus again energizing the signaling element. By providing diaphragms of predetermined resilience or diaphragms which will react under a prescribed pressure, it will be readily apparent that the air pressure within the tire can be maintained within narrow limits.

Where the device may be used upon heavy duty vehicles such as trucks, the circuit controlling unit may be mounted directly upon the valve stem of the tire inner tube, as shown in Fig. 5. In order to accomplish this application of the unit, the coupler 17 by which the air carrying pipe 18 is secured to the control unit as shown in Fig. 1, is removed and the threaded end of the stem 4 is secured directly in the threaded end of the passage 13 in place of this coupler. It will be readily seen that when the tire is to be inflated after the unit has been mounted in this manner, such inflation is accomplished by opening the outer end of the valve inside casing 15 and applying the usual air hose thereto so that the air will flow past the valve inside 16 into the tire tube and also into the air pressure chamber 10.

Where the valve tube 4 may be of the all-metal type so that it will be in contact with the metallic rim of the wheel, the metallic body 6 of the unit will be properly grounded so that the signaling circuit may be readily completed by means of the cooperating claw and terminal post, but in the event that the valve tube is of the later rubber form, then means has to be provided for grounding the body 6 with the metal wheel rim and such grounding connection may be made by attaching a current conducting wire to the ground post 46 carried by the casing 6 and fixing such wire to any suitable adjacent metal part of the wheel rim.

In Fig. 1 where the pressure responsive unit is shown mounted at the center of a pneumatic wheel, upon the hub of the wheel, the unit is shown with the valve element 15 connected therewith, but maintained inoperative since in this position introduction of air would be accomplished through the valve unit 37. It has previously been stated that it is desirable that the weight of the device be kept at a minimum so that there may be as little material added eccentrically to the wheel as possible, thereby avoiding unbalancing the wheel. It is, therefore, contemplated that in the use of the pressure responsive device upon the hub of the wheel, it may be further lightened by removing the valve structure 15 and by closing the threaded port 14 by means of a plug 15', as illustrated in Fig. 7. It will thus be seen upon reference to this figure that a considerable portion of the structure as shown in Figs. 1 and 3, is removed from the pressure responsive unit and consequently, the weight of the unit is lightened and its effect upon the balance of the wheel will be accordingly further reduced.

In the illustration and description of the present invention, the pressure responsive device has been shown and described in association with a pneumatic tire. While the device was primarily designed for such use, it will be readily apparent that it may have use in various other fields where receptacles for fluids under pressure are employed, whether such fluids be in the form of gases or liquids, therefore, it is to be understood that it is not contemplated that the invention be limited to use upon pneumatic tires but that it may be used in connection with any fluid containing receptacle where it may be found of service.

From the foregoing, it will be readily apparent that the tire pressure change indicator of the present invention is of novel form and may be made relatively small and light so that it might be easily mounted upon a wheel or directly upon a tire valve stem, and it will also be apparent that its novel construction facilitates the ready control of a signaling circuit for indicating over or under-inflation of the tire with which it is associated.

What is claimed is:

1. A fluid pressure switch comprising a metallic body having a chamber formed in and opening through a side thereof, an annular shoulder formed around the inside of said chamber and having a relatively sharp edge directed toward the open side of the chamber, said sharp edge forming a diaphragm supporting rib, a thin circular metallic diaphragm resting adjacent its edge upon said rib, an insulation body removably secured in the open side of the chamber and having an annular face bearing against said diaphragm opposite from and pressing the diaphragm against the rib, said diaphragm upon flexing rocking upon the rib, said insulation body having a chamber opposing the diaphragm, means for introducing fluid under pressure into the first chamber against the diaphragm, a terminal post carried by the insulation body and having an end in spaced relation with the diaphragm, means forming a part of said post providing a pair of spaced and opposed fixed contacts, and a movable current conducting contact electrically connected with and supported upon the diaphragm within the chamber of the insulation body and disposed between and adapted to move relative to the fixed contacts upon the flexing of the diaphragm.

2. A pressure controlled switch, comprising a metal body having a chamber formed in and opening through a side thereof, an annular shoulder formed around the inside of the chamber and having a surface facing the open side of the chamber, said shoulder surface being sloped back away from the open side of the chamber from its edge to the adjacent wall of the chamber whereby there is formed a relatively sharp annular diaphragm supporting rib, a thin metallic diaphragm supported adjacent its periphery upon said sharpened rib and having its periphery free of contact with the adjacent surrounding wall of the chamber, a body removably secured in the open side of the chamber and having an annular inner surface bearing against the diaphragm in opposed relation with the rib, said body having a chamber formed therein and opening toward the diaphragm, a terminal post extending through said body into the chamber formed therein and supported thereby in insulated relation with the first body, the terminal post having an end in spaced relation with the diaphragm, means forming a pair of spaced fixed contacts carried by the terminal post, and a movable current conductor supported on and electrically connected with the diaphragm and having a portion interposed between the fixed contacts for electrical connection with one thereof upon flexing of the diaphragm to a predetermined extent in one direction, and means for introducing fluid under pressure into the first chamber, said diaphragm being biased to flex into the first chamber upon reduction of the fluid pressure beyond a predetermined point to bring the movable contact into electrical engagement with a fixed contact.

JOHN W. WILLS.